March 14, 1967 L. J. BALOG 3,309,280
PRESSURE-TUBE NUCLEAR REACTOR INCLUDING
FUEL ASSEMBLY WITH THERMAL BAFFLE
Filed Dec. 24, 1964 3 Sheets-Sheet 1

INVENTOR.
LEONARD J. BALOG
BY
Roland A. Anderson
Attorney:

March 14, 1967  L. J. BALOG  3,309,280
PRESSURE-TUBE NUCLEAR REACTOR INCLUDING
FUEL ASSEMBLY WITH THERMAL BAFFLE
Filed Dec. 24, 1964  3 Sheets-Sheet 3

INVENTOR.
LEONARD J. BALOG
BY
Attorney:

United States Patent Office 3,309,280
Patented Mar. 14, 1967

3,309,280
PRESSURE-TUBE NUCLEAR REACTOR INCLUDING FUEL ASSEMBLY WITH THERMAL BAFFLE
Leonard J. Balog, Irwin, Pa., assignor, by mesne assignments, to the United States of America as represented by the United States Atomic Energy Commission
Filed Dec. 24, 1964, Ser. No. 421,133
3 Claims. (Cl. 176—61)

The invention described herein was made in the course of, or under contract AT(30–1)–2289 with the U.S. Atomic Energy Commission.

This invention relates to thermally insulated nuclear reactor fuel assemblies. More specifically it relates to improved fuel assemblies provided with an integral thermal barrier between the fuel-primary coolant region and the moderator region in a thermal reactor.

In certain types of thermal reactors it has been found desirable to provide thermal insulation between the fuel material and coolant and the surrounding medium, such as the moderator. Such thermal insulation means in the past has generally been a separate component of the reactor core construction having a single function. Additional components are normally required for attaching the thermal insulation to other parts of the core and to serve as structural members for supporting the reactor core components, such as the fuel elements for example. Since reactor core materials are relatively expensive, the use of extra components for insulation, structural support members, joining members, etc., should for economic reasons be avoided wherever possible.

This invention has eliminated the need for extra structural support members for fuel assemblies in a reactor core by providing a unique design of thermal baffles which combines the functions of thermal insulation and structural support in an integral unit, thereby reducing the inventory of high cost material heretofore required.

It is an object of this invention to provide an improved thermal insulating means between the primary coolant zone and the surrounding moderator in a nuclear reactor.

It is a further object of this invention to provide an improved thermal baffle for a nuclear reactor fuel assembly which minimizes the required amount of costly reactor material.

It is a still further object of the invention to provide an improved thermal baffle for a reactor fuel assembly which has the function of providing structural support as well as thermal insulation.

The above objects are accomplished by this invention in providing in a heavy water moderated, heavy water cooled, pressure-tube reactor a thermal baffle which extends from above the upper reflector region above the fuel assembly to the lower end of the fuel assembly having improved structural features enabling it to support the fuel assembly in a manner to eliminate the need for extra support members and material.

The manner in which this invention accomplishes the above objects and its inherent advantages will be apparent from the following description when taken in conjunction with the attached drawings wherein.

Figure 1:
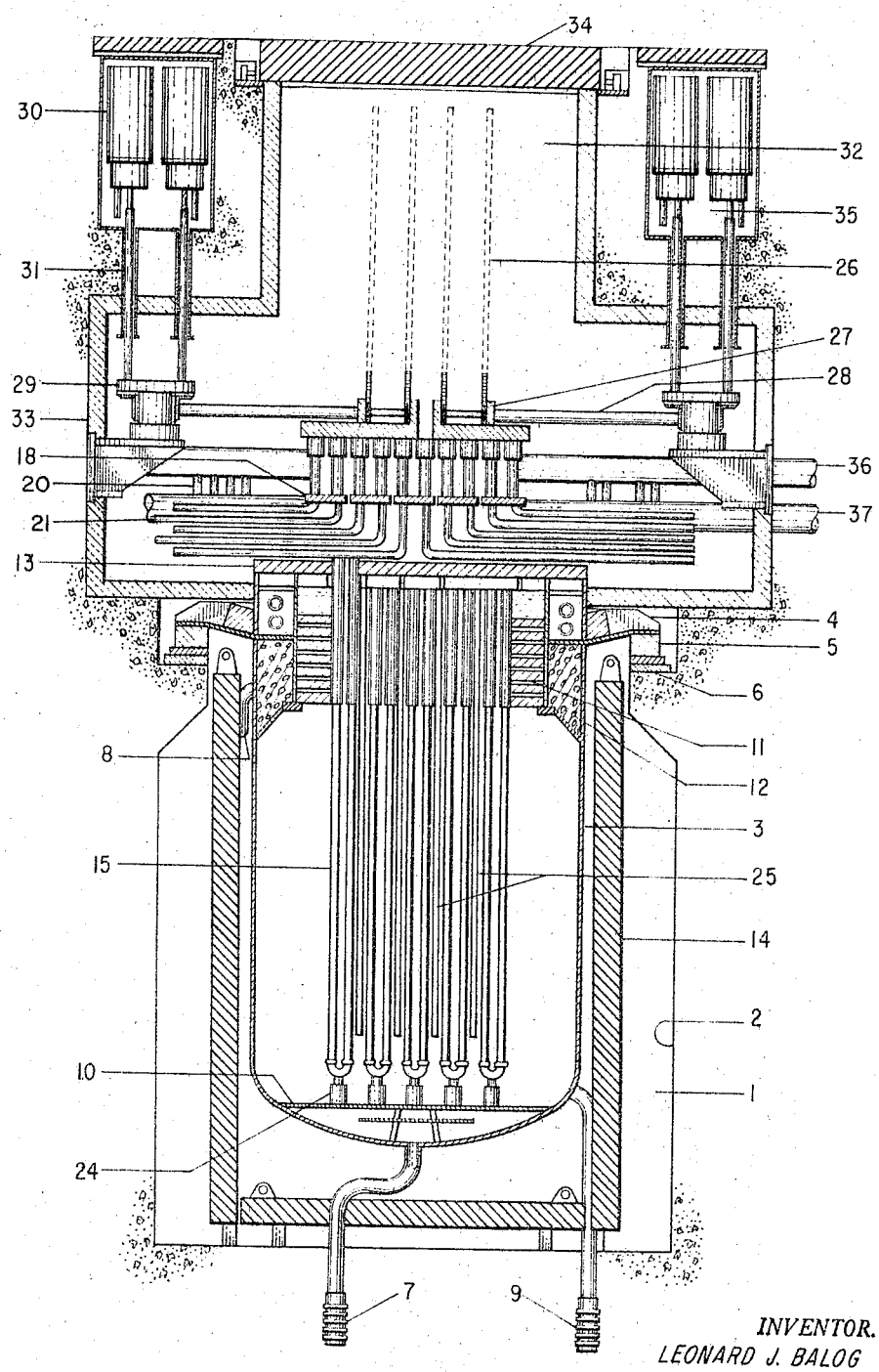
FIG. 1 is an elevation view with parts shown in section of a pressure-tube reactor design which utilizes the invention.

A reactor in which the thermal baffles of the invention are utilized will first be described. It may be of the type described in the Final Hazards Summary Report, No. CVNA 90, vol. II, Part B, January 11, 1962, and The Nuclear Design of the CVTR Core, CVNA–147, July 1962, Carolinas Virginia Nuclear Power Associates, Inc., Columbia S.C., consisting of a tank for heavy water in which are suspended U-shaped pressure tubes, each of which contains fuel assemblies in each leg of the U. Heavy water coolant enters at the top of one leg, passes through the U-tube and leaves from the top of the other leg. The tank is suspended in a cavity in a concrete biological shield and supports on its top a heavy base plate on which are mounted the supports for the pressure-tubes and control rods.

The reactor is contained within a cavity 1 in a steel line, reinforced concrete vapor container and biological shield 2. The moderator tank 3 is an upright cylindrical steel vessel which is supported at its top by radial beams 4 mounted on pads 5 which rest on an integral ledge 6 of the surrounding concrete shield structure. Moderator supply pipe 7 is connected to the bottom of the tank and a plurality of peripheral outlet pipes 8 are connected near the top. Dump lines 9 are also provided near the bottom of the tank. A perforated plate 10 located inside the tank near the bottom above the inlet pipe connection serves as a moderator flow distributor plate. A neutron shield 11 formed by alternate layers of steel and heavy water, occupies the top region of the tank. The shield is surrounded by an annulus of barytes aggregate 12 to provide additional shielding. The moderator substantially completely fills the tank leaving a small space at the top and radiolytic gases released from the surface thereof are removed by a conventional blanket gas system, wherein helium enters the moderator tank at the top, sweeps the surface of the heavy water, passes through penetrations in the core support structure to enter the header cavity 32 above the core, leaving through an outlet pipe near the top. A core support plate 13 is attached to the top of the tank serving as a top closure therefor and as the support means from which the pressure-tubes are vertically suspended. The moderator tank is surrounded at its sides and bottom by a carbon steel thermal shield 14.

Figure 2:
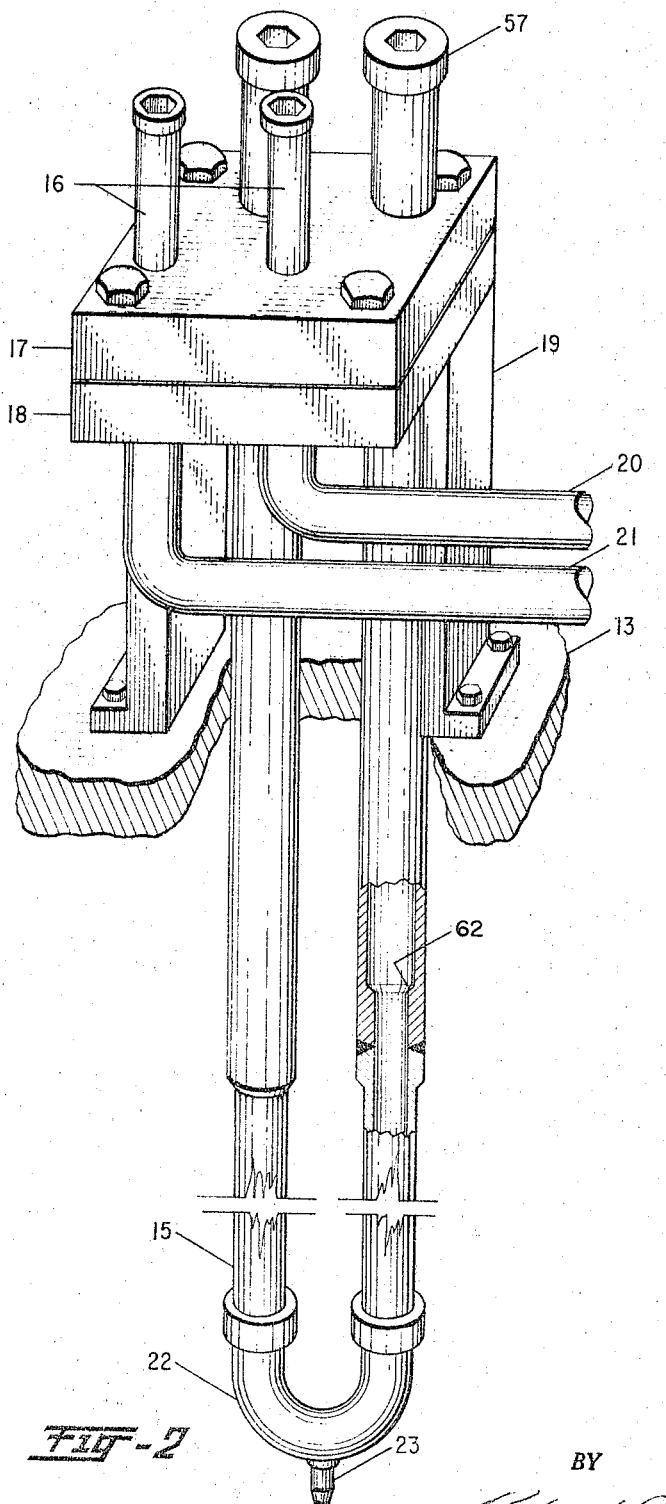
FIG. 2 is a prespective view of the pressure tube assembly and support means with parts broken away for clarity.

As shown in FIG. 2, each pressure tube assembly consists principally of a U-tube 15, two short straight transition tubes 16 and a connector block 17, which contains internal flow passages, not shown, between the transition tubes and the legs of the U-tube. The transition tubes and connector block connect the pressure-tube through jumper tubes to main inlet and outlet headers, 36 and 37, for the primary coolant. The U-tube penetrates the core support plate 13 and neutron shield 11 and is mounted at its top on jumper block 18 which is supported by support columns 19 attached to the top of the core support plate 13. Inlet jumper tube 20 and outlet jumper tube 21 are connected through the bottom of jumper block 18 to transition tubes 16 at one end and at their other ends to the main primary coolant headers. The U-tubes 15 are each comprised of two elongated straight tubes connected at their lower ends to U-section 22 having at its lower external portion a guide pin 23 which is adapted to fit into one of the pin sockets 24 on the top of moderator distributor plate 10.

The primary coolant enters the lower end of one transition tube 16 from the inlet jumper tube 20 and flows up the tube to the internal passage within the connector block from where it flows into the inlet leg of the U-tube, flowing downward therethrough. The flow direction is reversed at the bottom of the U-tube and the coolant flows upward through the outlet leg of the tube, through the connector block passageway at the top to the outlet transition tube, thence downwardly and through the outlet jumper tube 21. Below the top neutron shield 11 the pressure-tube is preferably made of Zircaloy–4 and the upper portion, in the neutron shield region and above, which is outside the core and reflector regions, may be type 403 stainless steel. These disimilar metals may be joined by some conventional welding or mechanical joining technique. Annular shoulder 62 is provided in the bore near the lower end of the steel portion of the pressure-tube to serve as a support for the fuel assembly as will appear below. The lower ends of the straight portions of the pressure-tubes are preferably attached to the U-sections 22 by mechanical joints to avoid hydride embrittlement caused by welded joints.

Control is accomplished by a plurality of elongated, rectangular-cross-section control rods 25 of boron stainless steel and perforated stainless steel, to obtain the desired reactivity worth, disposed between the pressure-tubes. These rods are suspended vertically through penetrations in the core support plate and neutron shield and have gear rack extensions 26 connected to their upper ends above the core. These racks are engaged by pinions 27 mounted on horizontal shafts 28 which are connected at their outer ends to miter gear assemblies 29. The miter gear assemblies are driven by electric drive motors 30 through vertical drive shafts 31. Operation of the drive motors is controlled in any customary manner for inserting and retracting the control rods in the core region. This operating mechanism is designed to scram the control rods by gravity in a conventional manner which is not a part of this invention. The control rod drive mechanism, jumper tubes, extension gear racks and upper portions of the pressure-tube assemblies are disposed in the header cavity 32 above the core. The header cavity is substantially surrounded by suitable thermal insulation 33 and is closed at the top by removable shield plug 34. The control rod drive motors 30 are located in separate cavities 35 in the concrete biological shield for easy access.

Figure 3:
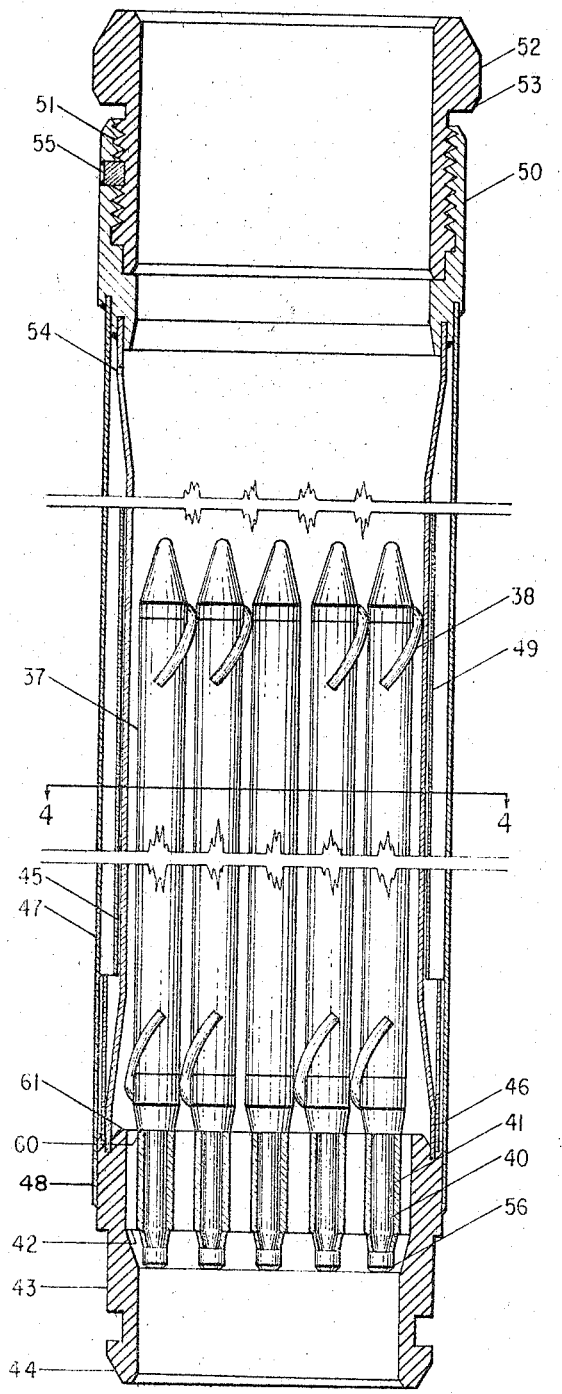
FIG. 3 is an elevation view in cross-section of the fuel assembly of the invention taken along the line 3—3 of FIG. 4.
Figure 4:
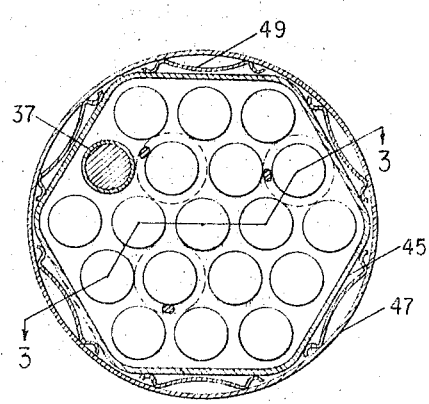
FIG. 4 is a cross-sectional view taken along line 4—4 of FIG. 3.

The fuel assembly of the invention, shown in FIGS. 3 and 4, is removably insertable within the legs of the pressure-tubes and is comprised essentially of a plurality of elongated fuel rods 37 nested in parallel within a tubular sheath. The basic fuel element is a full-core-length rod and may be composed of any suitable fuel material but preferably is pressed and sintered $UO_2$ pellets in a free-standing Zircaloy–4 jacket. Each of the fuel rods is helically wrapped with Zircaloy–4 wire 38 of such a size as to maintain proper spacing between the fuel rods when they are nested and promote coolant mixing. This wire is welded at each end to the upper and lower ends of each fuel rod, and it is under tension. The lower end of each fuel rod is provided with a cylindrical pin type extension 40 which is adapted to closely fit fuel rod positioning holes 41 in lower grid 42. The lower grid is attached to the I.D. of, or is intergral with, lower tubular guide ring 43 which has tapered end 44 for guiding the fuel assembly in the pressure-tube. A shoulder 60 is provided on the lower end of the fuel rod at the transition between the rod end and extension pin 40. This shoulder abuts against the top surface 61 of grid 42 in the assembled position to support the weight of the fuel rod.

A tubular flow baffle 45 of hexagonal cross section surrounds the fuel bundle in tight fitting relationship and is fixed at its lower end 46 as by welding to lower guide member 43. Surrounding the hex baffle in spaced relationship thereto is a circular tubular baffle 47 which is also attached at its lower end 48 to guide member 43, as by welding for example. Six baffle strips 49 of substantially U-shaped cross section are clamped between the outside of the hex baffle and the inside of the adjacent cylindrical baffle to eliminate the large convection area between these two baffles. The two baffles 45 and 47 are attached at their upper ends, as by welding, to upper end ring 50. This end ring is threadedly connected as shown at 51 to upper guide ring 52. The upper guide ring has a larger outside diameter than that of the upper end ring 50 and is adapted to closely fit within the bore in the upper steel section of the pressure tube and is provided with an external tapered shoulder 53 which seats on internal shoulder 62 of the pressure-tube to serve as the support means for the entire fuel assembly. All parts of the assembly lying in the core section, i.e., the baffles, grid, lower guide ring, baffle strips and end ring should be made from Zircaloy–4. The upper guide ring may be a suitable steel. As shown in the drawing, the baffles are longer than the fuel rods to provide a reflector region in the reactor between the fuel rods and the neutron shield 11. The hex flow baffle is made of sufficient cross-sectional thickness to sustain the weight of the fuel assembly components below end ring 50 and the stresses caused by differential pressure between the inside and outside thereof.

An additional separate baffle assembly to serve as an outer thermal baffle comprising concentric spaced circular tubes with stagnant water layers therebetween and located between the fuel assembly outer baffle 47 and the inside diameter of the pressure-tube may be provided if desired.

Where the fuel assembly is disposed in the inlet leg of a pressure tube the coolant flows through the fuel assembly in the direction from upper guide ring 52 to lower guide ring 43. Vent holes 54 are provided in the hex baffle near the inlet ends of the assemblies for the admission of primary coolant to the spaces between the bafflles thereby providing a stagnant layer to prevent convection in this region between the primary coolant and fuel assembly within the pressure-tube and the surrounding regions, which in the reactor illustrated is the moderator. With these vent holes 54 located near the inlet ends of the fuel assembly, the outside of the hex baffle is subjected to the pressure of the primary coolant at the inlet. Due to the pressure drop through the fuel assembly a differential pressure thus exists between the inside and outside of the hex baffle in the fuel region, which because of the relatively thin cross-section of the hex baffle tends to displace it radially inwardly against the internal fuel bundle thereby assisting in the dynamic stability of the assembly by squeezing the fuel bundle tightly together. Where this fuel assembly is used in the outlet leg of the pressure-tube, of course the vent hole 54 would be placed at the opposite end of the fuel assembly to take advantage of this feature. Moreover, in the event the fuel assembly is positioned in the outlet leg of the pressure-tube a means is provided at the lower end of fuel rod extension member 40, such as enlarged head 56 for retaining the fuel rods in position against the force of the primary coolant flow. A locking pin 55 welded in place in upper end ring 50 may be used to lock the end ring and upper guide ring against relative rotation in a conventional manner.

The fuel assemblies are inserted in the pressure-tube legs through refueling ports at the top thereof which are provided with removable plugs 57. These may be of any suitable design. It is also desirable to provide a neutron streaming shield within the pressure-tubes above the fuel assemblies in the region of the top neutron shield. The streaming shield may be an elongated rod of suitable neutron shielding material such as 304 stainless steel which is designed to fit in closely spaced relationship within the upper steel portion of the pressure-tube and is helically grooved on its external surface to allow for primary coolant flow.

The instant fuel assembly design provides optimum efficiency in a pressure-tube reactor by maintaining the amount of high cost reactor core materials at a minimum and by minimizing the fuel assembly support structure in the flow channels thereby reducing pressure losses caused by the restrictions imposed by them.

What is claimed is:
 1. In a nuclear reactor wherein U-shaped pressure-tubes are suspended within a tank of liquid moderator, fuel as- semblies are disposed within the legs of the pressure-tubes, and primary coolant is circulated through the pressure-tubes, an improved fuel assembly comprising a flow baffle of tubular shape with a plurality of flat sides, a hollow cylindrical thermal baffle surrounding said flow baffle in spaced relationship thereto, an upper guide ring and a lower guide ring to which the upper and lower ends of said flow baffle and said thermal baffle are attached, a grid member extending across the coolant flow path defined by said flow baffle and said guide rings, a plurality of fuel rods positioned by said grid member in parallel relationship and held nested together by said flow baffle, spacing means provided on said fuel elements of such a size as to maintain proper spacing therebetween when in nested relationship within said flow baffle, and apertures near the inlet end of said flow baffle to provide stagnant primary coolant between said baffles.

2. The improved fuel assembly of claim 1 wherein elongated baffle strips are provided between said flat sides of said flow baffle and said cylindrical thermal baffle to reduce convection currents therebetween.

3. In a heavy water moderated, heavy water cooled nuclear reactor wherein U-shaped pressure-tubes are suspended within a tank of heavy water, fuel assemblies are disposed within the legs of the pressure-tubes, and primary heavy water coolant is circulated through the pressure-tubes, an improved fuel assembly comprising a plurality of fuel rods arranged in parallel spaced relationship to form a cylindrical bundle, each rod comprising clad fissionable material having a positioning guide pin at one end, spacing wires attached to the fuel rods and helically wound on the outer surface of the cladding, a tubular flow baffle closely fitting about said fuel bundle extending at least from the bottom end to a distance beyond the top end thereof sufficient to provide a neutron reflector region above the fuel region, a hollow cylindrical thermal baffle surrounding the flow baffle in spaced relationship thereto, a hollow cylindrical lower guide ring, a grid member attached to said lower guide ring extending at right angles across the coolant flow path, spaced apertures in said grid for receiving the fuel rod positioning guide pins, said baffles being attached at one end to the lower guide ring, a hollow cylindrical baffle end ring attached to the other end of the baffles, said end ring being threadedly connected to a hollow cylindrical upper guide ring, an external shoulder on said upper guide ring adapted to engage an internal shoulder in said pressure-tube to support the fuel assembly thereby, elongated baffle strips of U-shaped cross-section compressed between said baffles, and apertures near the inlet end of the flow baffle to provide stagnant primary coolant between said baffles.

References Cited by the Examiner

UNITED STATES PATENTS

| | | | |
|---|---|---|---|
| 2,938,848 | 5/1960 | Ladd et al. | 176—78 |
| 2,987,458 | 6/1961 | Breden et al. | 176—54 |
| 3,071,527 | 1/1963 | Young | 176—52 |
| 3,091,582 | 5/1963 | Bradley | 176—78 |
| 3,104,218 | 9/1963 | Speidel et al. | 176—78 |
| 3,108,053 | 10/1963 | Vrillon et al. | 176—43 |

FOREIGN PATENTS 1,222,856    1/1960    France.

CARL D. QUARFORTH, *Primary Examiner.*

L. DEWAYNE RUTLEDGE, *Examiner.*